(12) United States Patent
Jen

(10) Patent No.: US 6,461,513 B1
(45) Date of Patent: Oct. 8, 2002

(54) SECONDARY-FLOW ENHANCED FILTRATION SYSTEM

(75) Inventor: Chang-Wei Jen, Bedminster, NJ (US)

(73) Assignee: Filtration Solutions, Inc., Hackettstown, NJ (US)

( * ) Notice: Subject to any disclaimer, the term of this patent is extended or adjusted under 35 U.S.C. 154(b) by 0 days.

(21) Appl. No.: 09/574,509

(22) Filed: May 19, 2000

(51) Int. Cl.⁷ ............................................. B01D 61/00
(52) U.S. Cl. .................... 210/650; 210/323.2; 210/444; 210/443
(58) Field of Search ............................. 210/650, 323.2, 210/444, 443, 440, 441, 257.2, 799

(56) References Cited

U.S. PATENT DOCUMENTS

| | | | |
|---|---|---|---|
| 3,768,660 A | * | 10/1973 | Block |
| 4,592,848 A | * | 6/1986 | Pabst |
| 4,636,309 A | * | 1/1987 | Bellhouse |
| 5,314,018 A | * | 5/1994 | Cobb |
| 5,490,926 A | * | 2/1996 | Hammeken |
| 5,628,909 A | * | 5/1997 | Bellhouse |
| 5,736,045 A | * | 4/1998 | Bies et al. |
| 5,810,081 A | * | 9/1998 | Cobb et al. |
| 6,274,038 B1 | * | 8/2001 | Reid |

* cited by examiner

Primary Examiner—Ana Fortuna
(74) Attorney, Agent, or Firm—Thomas R. Williamson III

(57) ABSTRACT

A filter unit includes a cross-flow filtration assembly. The cross-flow filtration assembly includes an elongate cylindrical filter housing having an interior cylindrical wall defining an elongate filter cavity. The filtration assembly also includes a tangential feed inlet in fluid communication with the filter cavity extending substantially tangential to the interior cylindrical wall and an opposed retentate outlet port in fluid communication with the filter cavity. An elongate cylindrical filter cartridge supported in the filter housing includes an elongate porous cylindrical filter wall having an elongate cylindrical outer filter surface and an elongate inner filter surface defining a permeate passageway. One end of the filter cartridge defines a permeate outlet port in fluid communication with the permeate passageway and the opposite end of the cartridge is closed by a non-porous filter cap. A spiral fluid guide spans between the interior cylindrical wall of the filter housing and the outer filter surface of the cartridge to define a spiral fluid passageway extending between the feed inlet and retentate outlet ports. The spiral fluid passageway may be of dimension to impart secondary flow currents, particularly Dean-Flow currents, to fluid flowing therethrough to prevent particulate build-up on the filter media so as to better maintain permeate flow rate from the filter.

17 Claims, 8 Drawing Sheets

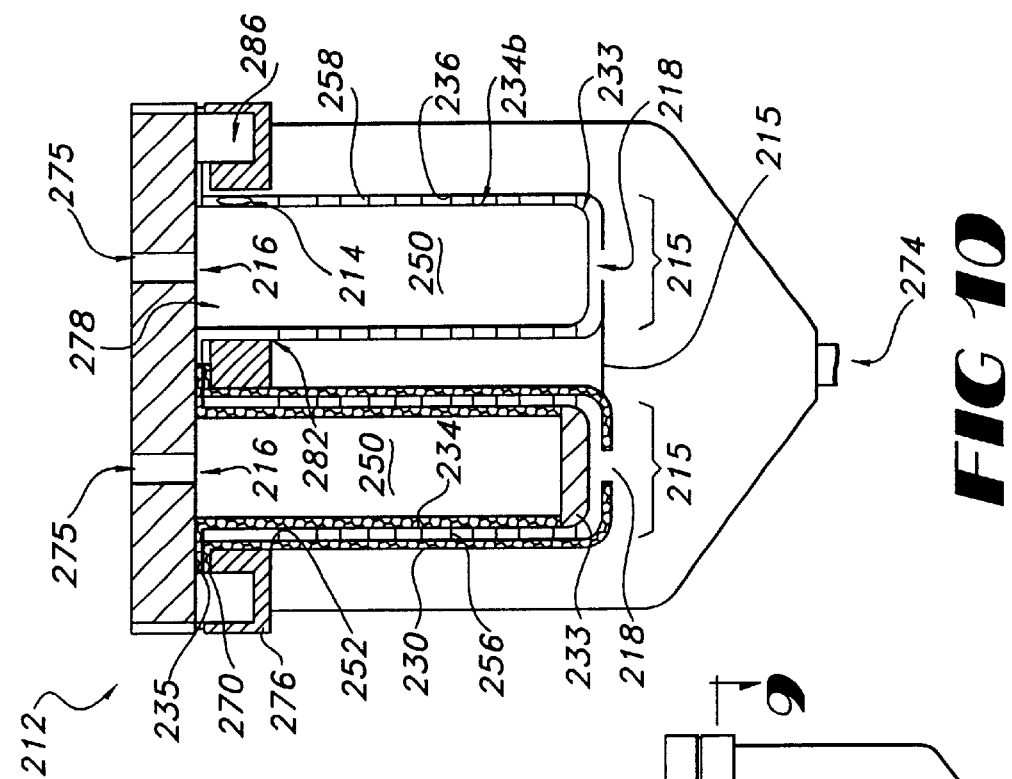
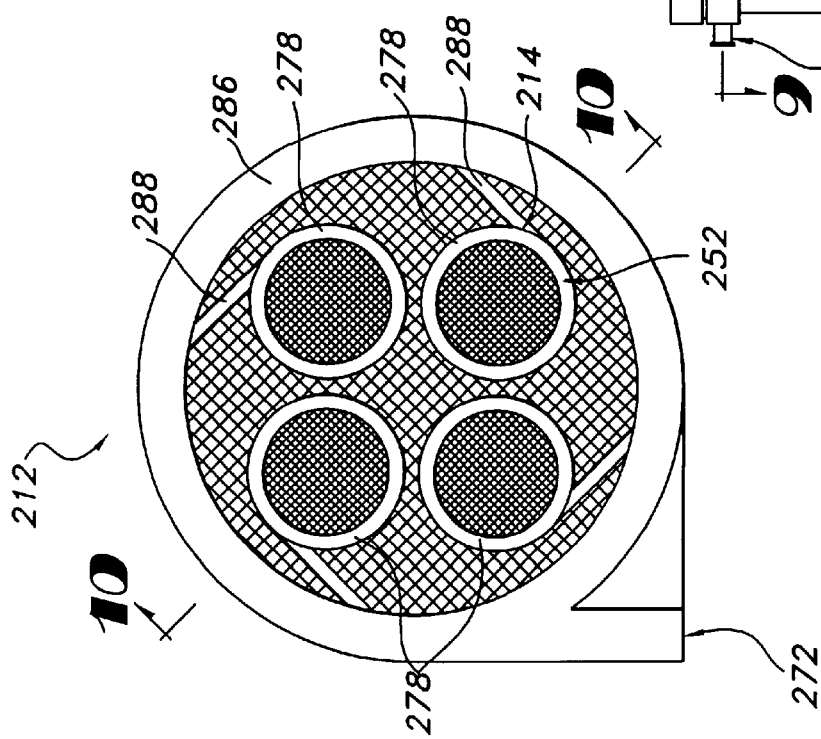

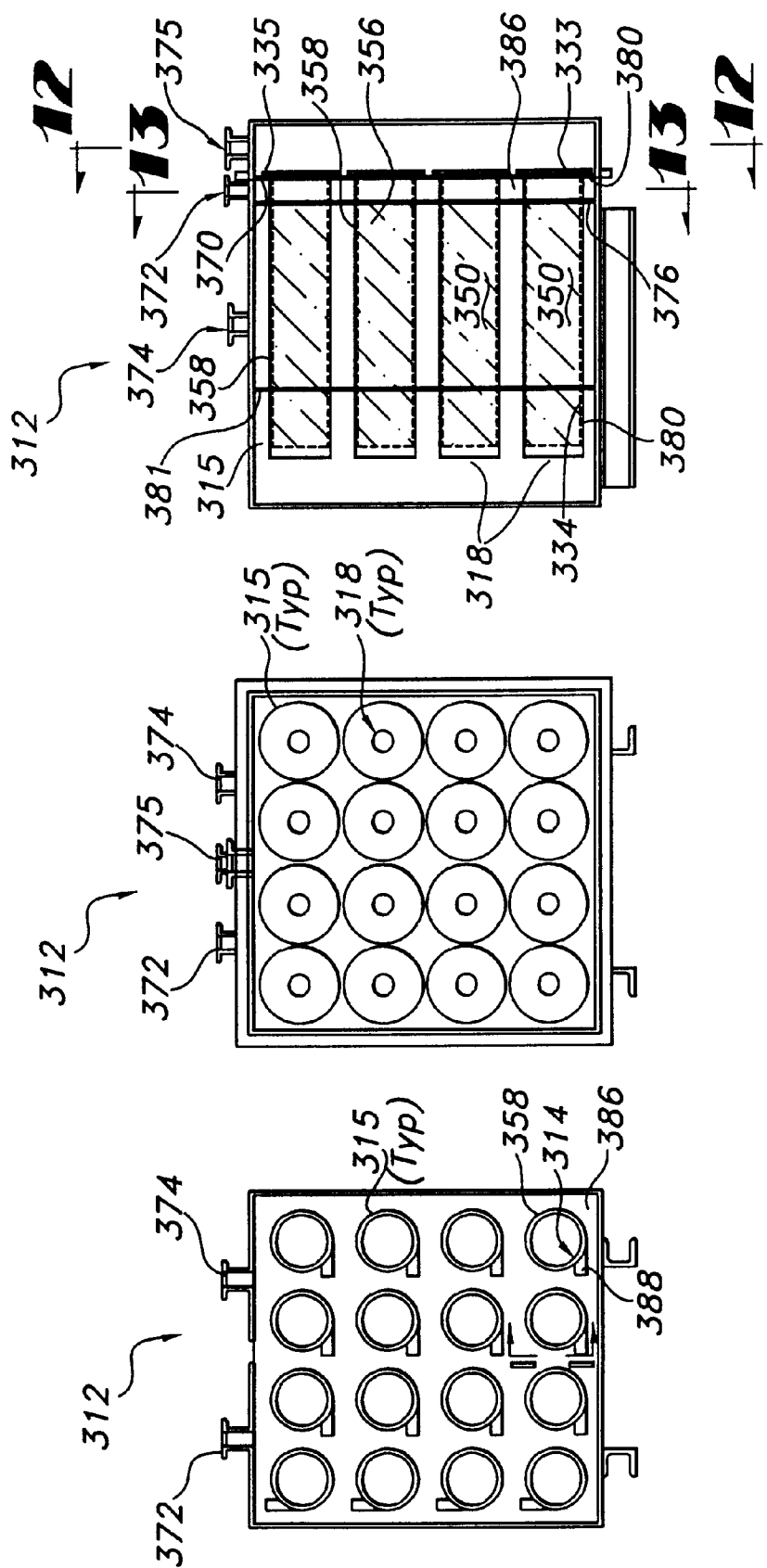

SECONDARY-FLOW ENHANCED FILTRATION SYSTEM

FIELD OF THE INVENTION

The present invention is directed to the field of filtration systems. More specifically, the present invention is directed to a filtration system combining cross-flow currents and secondary flow currents such as Dean-Flow currents to assist in surface cleaning of the filter unit.

BACKGROUND OF THE INVENTION

The art has seen various filtration devices employing different methods for removing particulate or impurities from a feed fluid. For example, so-called dead end filtration systems force all of the feed fluid through a filter to separate impurities therefrom. Dead end filters designs may place a filter either directly across a flowpath or at an oblique angle to the flowpath. U.S. Pat. No. 1,822,006 to Bull discloses a dead-end filter wherein the feed fluid enters a cylindrical chamber housing a cylindrical filter and follows a spiral flowpath from one end of the cylindrical filter to the other. All of the feed fluid eventually forced through the cylindrical filter as the fluid flowpath terminates adjacent the far end of the filter from the input end. A sump chamber is provided below the helical fluid flowpath and filter for collecting material separated by the filter component. As all of the fluid must pass through the filter and as the sump chamber is not open throughout operation, the velocity of the fluid about the filter will continuously decrease to zero unless the filter is cleared. U.S. Pat. No. 3,637,078 to Hollar discloses an oil filter having a spiral guide positioned about a pleated filter. The Hollar filter is another example of a dead-end filter design as all of the oil entering the filter must pass through the filter cartridge. Particulate and other contaminants collect on the filter surface within the expanses spanning between the adjacent pleats and the spiral guide.

Other filter designs employ a spiral fluid flowpath to separate heavier particulate from the fluid medium. These centrifugal particulate separation devices employ a spiral path to generate centrifugal forces which force the heavier particulate to the outside of the spiral flowpath. For example, U.S. Pat. No. 3,402,529 to Franz provides a spiral flowpath down along a cylindrical non-porous sleeve having a significantly wider mouth portion at one end. The fluid medium air flows within the spiral path to the inside of the flow of the heavier contaminants. The Franz filter collects the separated particles at the bottom of the unit opposite the open mouth portion which then acts as an intake for the air. The Franz design is impractical for applications where the fluid medium is a liquid such as a fuel, oil, or water, however, as many types of colloidal particulate are known which have a lower specific gravity than the fluid medium. Such lighter particulate will tend to be forced to the inside of the spiral path by the heavier fluid medium. These lighter particulate may collect in the filter itself and require the filter unit to be shut down and the filter replaced or cleaned.

Cross-flow filtration is yet another alternative method for filtering particulate from a fluid medium. Cross-flow filtration differs from dead-end filtration in that the feed fluid provided to the filter unit actually passes across the enclosed filter membrane or filter media. Cross-flow filtration describes the condition of fluid flow past a membrane while the fluid is being pressurized against the surface. Cross-flow filtration performance has been found to be governed the pore size of the filter media, the generated fluid shear force across the surface of the filter media, and the deposit layer and the control of the deposit layer formation. Only a portion of the feed fluid passes through the filter to become filtrate, or permeate, fluid. The other portion of the feed fluid continues past the filter media and exits the filter unit as concentrate, or retentate, fluid. Flow velocity is of fundamental importance to the performance of a cross-flow filter. Should the flow velocity across the surface of a filter media become zero, the cross-flow ceases and the dead-end filtration begins. Additionally, the cake which forms on the filter media at zero velocity becomes thicker as the flow velocity, parallel to the medium, decreases. The thickness of the cake layer in a flow channel is determined by the shear force on the membrane surface which is roughly in direct proportion to the feed viscosity and the feed flow velocity. Therefore, higher fluid velocity entails a thinner deposit layer, a lower hydraulic resistance, and a higher filtrate flux.

In almost every filtration process a 'secondary membrane', also called a 'dynamic membrane' will be created. The contaminants which constitute the secondary membrane first fill up the pores and then form a very thin cake of constant thickness. The transition time for pore filling may be very short. Particulate has been observed on first use of a filter to immediately enter into the pores of the filter media, although only to a limited extent. The result is that a cross-flow filtration system typically experiences a rapid flux drop at the beginning of its use for filtration. Thereafter, the flux is stabilized at a relatively satisfactory level, and remains almost constant with a very slow decline as the process continues. This is unlike dead-end filtration where the flux rate drops continuously from the time the filter is operated until complete clogging. The rate of flux drop depends on the selection of membrane pore size and the nature of the contaminants. Filter pore-size must therefore be selected with a view towards the expected contaminants in order to control the formation of the deposit layer.

It is further known that as fluid flows through a curved channel about a normal or longitudinal axis that a secondary flow, which is the flow perpendicular to the main direction of flow, occurs. The secondary flow phenomenon is caused by centrifugal force which forces the fast moving fluid in the channel core toward the outside wall from where it journeys back along the floor and roof of the channel to the inside wall. When the fluid is forced through the channel at a critical velocity, a double-vortex flow known as Dean-Flow currents is formed.

The phenomenon of Dean-Flow was first observed by W. R. Dean who studied the secondary flow created by the motion of fluid in a curved pipe. Flow in a curved channel appears unstable for small disturbances, compared with a sudden increase in the loss of head when flow passes through a straight pipe at a critical velocity, i.e., the transition from laminar to turbulent flow. No such sudden increase in the loss of head is generally observed in a pipe of significant curvature, even though flow rate is much higher than the critical flow rate. This phenomenon suggests that the pressure drop is much smaller in a curved pipe than in a straight pipe at the same flow rate. The flow in a curved channel has been characterized as a double vortex flow, as shown in FIG. 3. The Dean number, K, is the characteristic parameter used to describe the formation of vortices in this situation:

$$K=(v \cdot d/\upsilon) \cdot (d/R)^{0.5}$$

Where v is the tangential velocity of the fluid, d is the diameter of the pipe, R is the radius of the pipe curvature, and $\upsilon$ is the kinematic viscosity of the fluid. The higher the Dean number, the stronger the vortices induced.

Early studies on this secondary flow phenomenon were mainly focused on the heat transfer in a coiled heat exchanger. These studies showed that the heat transfer coefficient was much higher for a curved pipe than for a straight pipe. In recent years, studies on the double-vortex secondary flow show that the secondary flow may be employed to greatly reduce the filtered material concentration polarization in filters. As the fluid spins in a curved channel, a control mass of fluid travels radially, eventually reaching the outer wall where it must change direction towards a return path. The resulting flow profile takes the form of a toroidal vortex in which a fluid particle moves in three dimensions. The vortex profile generates a high shear rate which acts to transport material, or debris, away from the membrane surface. Such a vortex flow exists in both the laminar and turbulent flow regions and the vortex structure persists up to 1000 times the critical flow rate.

The prior art has seen different methods for creating and employing secondary flow currents to enhance the performance of pressure-driven filtration processes. For example, U.S. Pat. No. 5,626,758 to Belfort discloses a filtration device employing a wound helical membrane tube. Such a device, however, cannot be practically employed in a back-flush filtration system in which back pressure is applied to the permeate side the filter media. Back-flushing allows a reverse fluid flow to penetrate the filter media and clear any plugged pores so as to recover the decreased permeate flux rate. Periodic back-flushing is essential for challenging processes, e.g., those involving colloidal solids which are able to extrude into the pores of the filter media, so as to maintain an acceptable permeate flux rate across the filter media. Back-flushing provides a desirable alternative to shutting down the filter unit for filter media replacement.

U.S. Pat. No. 5,143,630 to Rochigo discloses a rotary disc device having spiral grooves formed on one face to generate Dean Flow vortices across. Additionally, U.S. Pat. No. 4,790,942 to Shmidt discloses a rotating cylinder filter for generating Taylor vortices within an annular gap outside the rotating cylinder. Both of these devices actively rotate the filtration components to establish the secondary flow currents for enhanced filter performance. The need for moving parts, however, can increase the maintenance burden on their users. Moreover, the Shmidt device may not be suitable for scale-up to high capacity applications due to the difficulty of bundling multiple rotating cylinders while maintaining the critical dimension of the annular gaps. Additionally, sealing fluid in multiple rotating shafts would be impractical.

While cross-flow filtration is a step improvement over dead-end filtration, an inherent weakness common to all traditional cross-flow filtration designs frustrates its operation: a pressure drop in the fluid passageway exists from the feed inlet to the concentrate outlet. The pressure drop results in a non-uniform pressure differential through the filter membrane across the entire length of the fluid passageway. As the pressure differential across the filter membrane is highest near the inlet end of a cross-flow filter, fouling of the filter membrane tends to occur there. The present invention solves this problem of fouling at a filter inlet by generating a secondary flow to assist in clearing away the particulate fouling the cross-flow filter.

The strength of the vortex action created by the secondary flow is directly proportional to the flow rate and the geometry of the curved channel. As the feed flow has the highest tangential velocity at the inlet, the vortices are the strongest there. The present invention contemplates that the stronger vortices at the inlet may be employed to compensate for the higher incidence of fouling which occurs at the inlet end of cross-flow filtration units. Overall, the secondary flow discussed may be employed to not only reduce the pressure drop along a filter, but also to enhance the shear force along the surface of the filter media to thereby reduce particulate build-up.

There is therefore a need for a cross-flow filtration system which can minimize the effects of the pressure drop along the filter membrane. There is also a need for a self-cleaning filter unit which is able to conduct colloidal particles having a lower specific gravity than the fluid medium away from a filter membrane. There thus exists, then, a need in the art, for a cross-flow filtration device having still further improved surface cleaning capabilities and which may be scaled down to occupy a small space for applications having limited available space for operation.

SUMMARY OF THE INVENTION

In view of the needs of the art, the present invention provides a cross flow filtration assembly which develops secondary flow currents in a fluid flowing in a spiral flowpath about a generally cylindrical filter media. Desirably the secondary flow currents developed by the spiral flowpath are Dean Flow currents. Dean Flow currents describe a particular flow regime developed for a spiraling fluid flowpath when fluid is forced therethrough at a critical flow velocity. Dean Flow currents are developed in opposing pairs of corkscrew vortices which travel along the spiral fluid flowpath and provide a shear cleaning current across the filter media surface so as to conduct away particles entrapped by the filter media. Fluid flowing through a spiral flowpath at less than the Dean Flow critical velocity will not develop the opposing corkscrew currents therein while fluid flowing too quickly through a spiral flowpath degenerates into a purely turbulent flow regime. Dean Flow currents have been demonstrated to better maintain the flux rate across a filter media so as to extend the operating period of a filter unit between required backflushing or maintenance.

The present invention provides a cross-flow filtration assembly including a filter housing having an elongate housing wall having opposed first and second open ends and an elongate cylindrical interior surface defining a housing cavity. A housing cap wall extends across the first open end of the housing wall, and a housing base wall extends across the second open end of the housing wall. The filter housing further defines an input feed port, a permeate output port, and a retentate output port, all in fluid communication with the housing cavity. An elongate porous filter is mounted within the housing cavity. The filter defines an open first end, an opposed closed second end, and an elongate cylindrical permeate passageway extending therebetween. The permeate passageway extends in fluid communication with the permeate output port through the first open end of the filter. The filter includes a substantially cylindrical outer filter surface, wherein the outer filter surface and the interior surface of the housing wall define an elongate annular gap therebetween. A spiral guide extends through the annular gap between the outer filter surface and the interior surface of the housing wall so as to define a fluid flow passage extending between the input feed port and the retentate output port. Fluid enters the filter assembly through the input feed port and into the fluid flow passage substantially along a tangential flowpath along said filter. The pitch and width of the spiral define a cross-sectional area for the fluid flow passage which, for the velocity of the fluid flowing therethrough, induces secondary flow currents in the fluid as it travels along the spiral fluid flow passage. Desirably, the filter unit develops Dean Flow currents through the spiral fluid flow passage.

The present invention also contemplates a filter unit employing a number of such cross-flow filtration assemblies. The filter unit includes an elongate cylindrical filter housing having an interior cylindrical wall defining an elongate filter cavity, a tangential feed inlet in fluid communication with the filter cavity extending substantially tangential to the interior cylindrical wall, and a retentate outlet port in fluid communication with the filter cavity. An elongate cylindrical filter cartridge supported in the filter housing includes an elongate porous cylindrical filter wall having an elongate cylindrical outer filter surface and an elongate inner filter surface defining a permeate passageway. One end of the cartridge defines a permeate outlet port in fluid communication with the permeate passageway and the opposite end of said cartridge is closed by a non-porous filter cap. A spiral fluid guide spans between said interior cylindrical wall of the filter housing and the outer filter surface. The spiral guide defines a spiral fluid passageway extending between the feed inlet and the retentate outlet port. The spiral fluid passageway imparts a secondary flow current to fluid flowing therethrough. The spiral fluid passageway may be of dimension so as to impart Dean-Flow currents to fluid flowing therethrough.

The filter unit of the present invention may further include a filter unit housing defining a filter unit housing cavity and a fluid feed port, a concentrate outlet port, and a filtrate outlet port in fluid communication with said filter unit housing cavity. A plurality of the cross-flow filtration assemblies are mounted within the housing cavity whereby for each of the plurality of cross-flow filtration assemblies the tangential feed inlet is in fluid communication with the fluid feed port of the filter housing and the retentate outlet port is in fluid communication with the concentrate outlet port of the filter housing. The permeate passageway is similarly in fluid communication with the filtrate outlet port of said filter housing The present invention also provides a method of filtering particles from a fluid. The method includes the step of providing a filtration assembly having an interior cylindrical filter, an outer filter housing concentrically supported about the interior cylindrical filter so as to define an annular fluid cavity therebetween, and a spiral guide spanning between the filter and the housing so as to define a spiral fluid passageway from one end of the filter to the opposed end of the filter. The method of the present invention then includes the step of forcing a feed fluid having particulate matter suspended therein through the fluid passageway at a velocity sufficient to induce secondary flow currents in the fluid so as to provide a shear cleansing current across the filter. The induced secondary flow currents may take the form of Dean Flow currents.

The present invention thereby provides a filtration assembly and filter unit having applications in reverse osmosis, nano-filtration, ultra-filtration, micro-filtration, and screen mesh, or particle, filtration applications.

BRIEF DESCRIPTION OF THE DRAWINGS

FIG. 8 is a plan view of another filter unit of the present invention.

FIG. 9 shows a top sectional view of the filter unit of FIG. 8 employing four Dean-Flow filtration assemblies, taken through the line 9—9.

FIG. 10 is a elevational view, partially in section, of the filter unit of FIG. 9 taken through the line 10—10.

FIG. 11 shows yet another filter unit of the present invention employing sixteen Dean-Flow filtration assembly cartridges.

FIG. 12 is a first side sectional view of the filter unit of FIG. 11 taken through the line 12—12.

FIG. 13 is a second side sectional view of the filter unit of FIG. 1 taken through the line 13—13.

DETAILED DESCRIPTION OF THE PREFERRED EMBODIMENT

Figure 1:
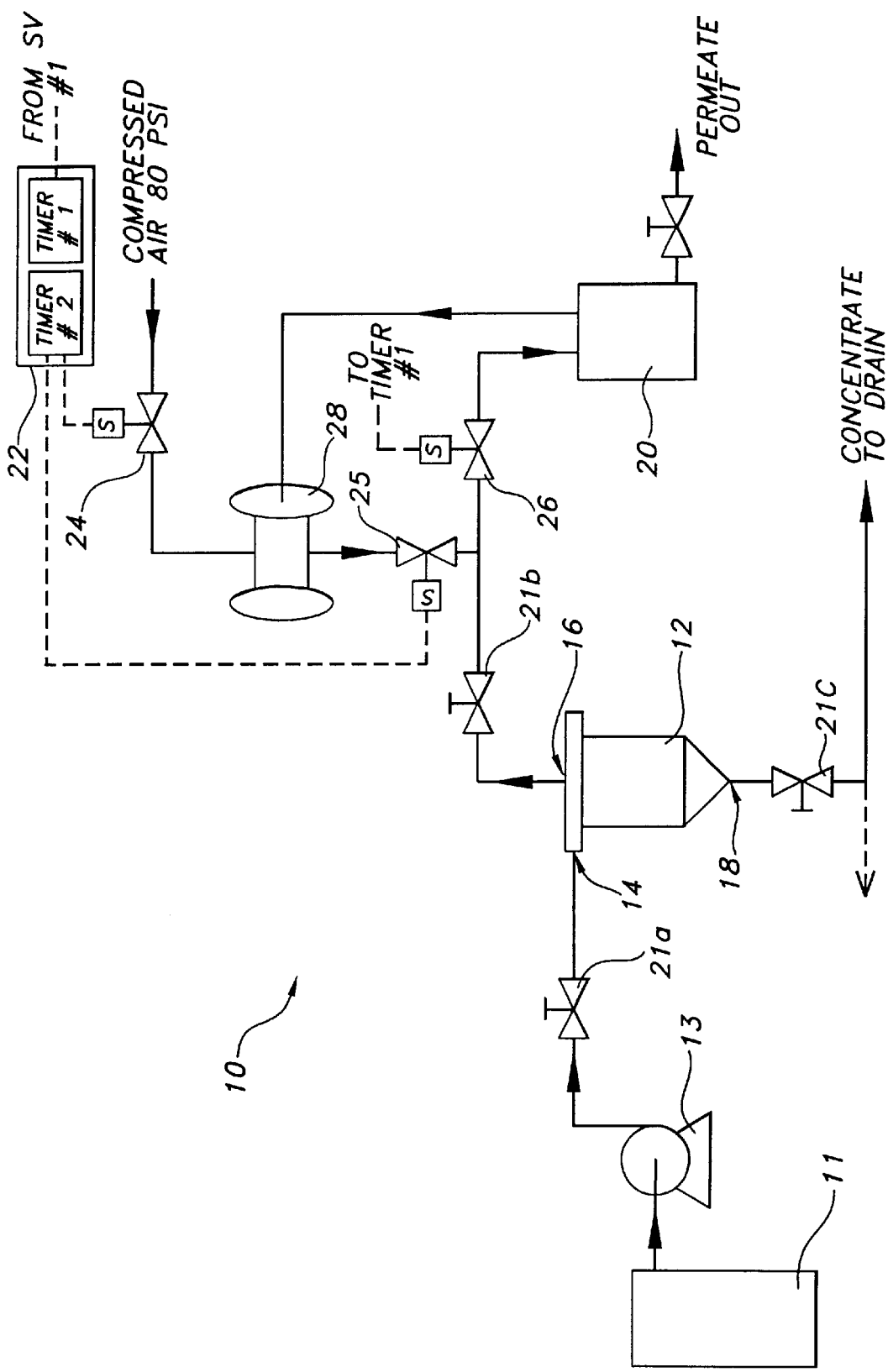
FIG. 1 depicts a schematic of a filtration system employing the filter unit of the present invention.

FIG. 1 shows a cross-flow filtration system 10 of the present invention. Filtration system 10 is desirably employed for delivering a fluid to a service tank from an initial storage reservoir 11. For clarity, a fluid employed in filtration system 10 is characterized at three different stages. Fluid delivered from storage reservoir 11 is referred to as a feed fluid. The feed fluid is then delivered via pump 13 to a cross-flow filter unit 12 where it then encounters a filtration media which collects foreign particulate. The feed fluid which passes through the filter media is then characterized as a filtrate, or permeate, fluid due to the cleansing of this fluid by the filter media. The feed fluid which does not pass through the filter is characterized as a concentrate, or retentate, fluid due to its having a higher concentration of foreign material as the original feed fluid.

Filtration system 10 includes a filter unit 12 having an input feed port 14 for unfiltered feed fluid, a filtrate discharge port 16 for conveying filtered feed fluid, and a concentrate discharge port 18 for conveying the unfiltered feed fluid which should now be even more saturated with impurities or undesired particulate. Filtrate fluid is drawn through filtrate discharge port 16 and delivered to a permeate, or filtrate, holding tank 20 from where the filtrate fluid may be delivered to, e.g., an engine or service tank. Concentrate fluid passes through the concentrate discharge port 18 and delivered to a drain or returned to the feed fluid storage tank 11 for additional cycles through filter unit 12. Filtration system 10 desirably includes ball valves 21a, 21b, and 21c in the fluid conduit connected to filter unit 12 for selectively isolating input feed port 14, filtrate discharge port 16, and concentrate discharge port 18, respectively.

FIG. 1 depicts additional components for providing automatic back flush of filter unit 12. A timing unit 22 controls the opening of a pair of servo-valves 24, 25 and the closing of a servo-valve 26 so as to allow compressed air through to a diaphragm pump 28. Diaphragm pump 28 forces filtrate fluid from holding tank 20 back through filtrate port 16 so as to back flush filter unit 12 by forcing any collected particulate out from entrainment within the filter screen. The back-flushed particulate is then carried by the feed fluid through concentrate output port 18 to drain. Timing unit 22 provides for automatic periodic back flushing of filter unit 12 which thereby prolongs the mean time between manually changing filter screens. As filtration system 10 must be shut down to change the filter screen of filter unit 12, the longer the time between changing filter screens the more time filtration system 10 may be operated.

Figure 2A:
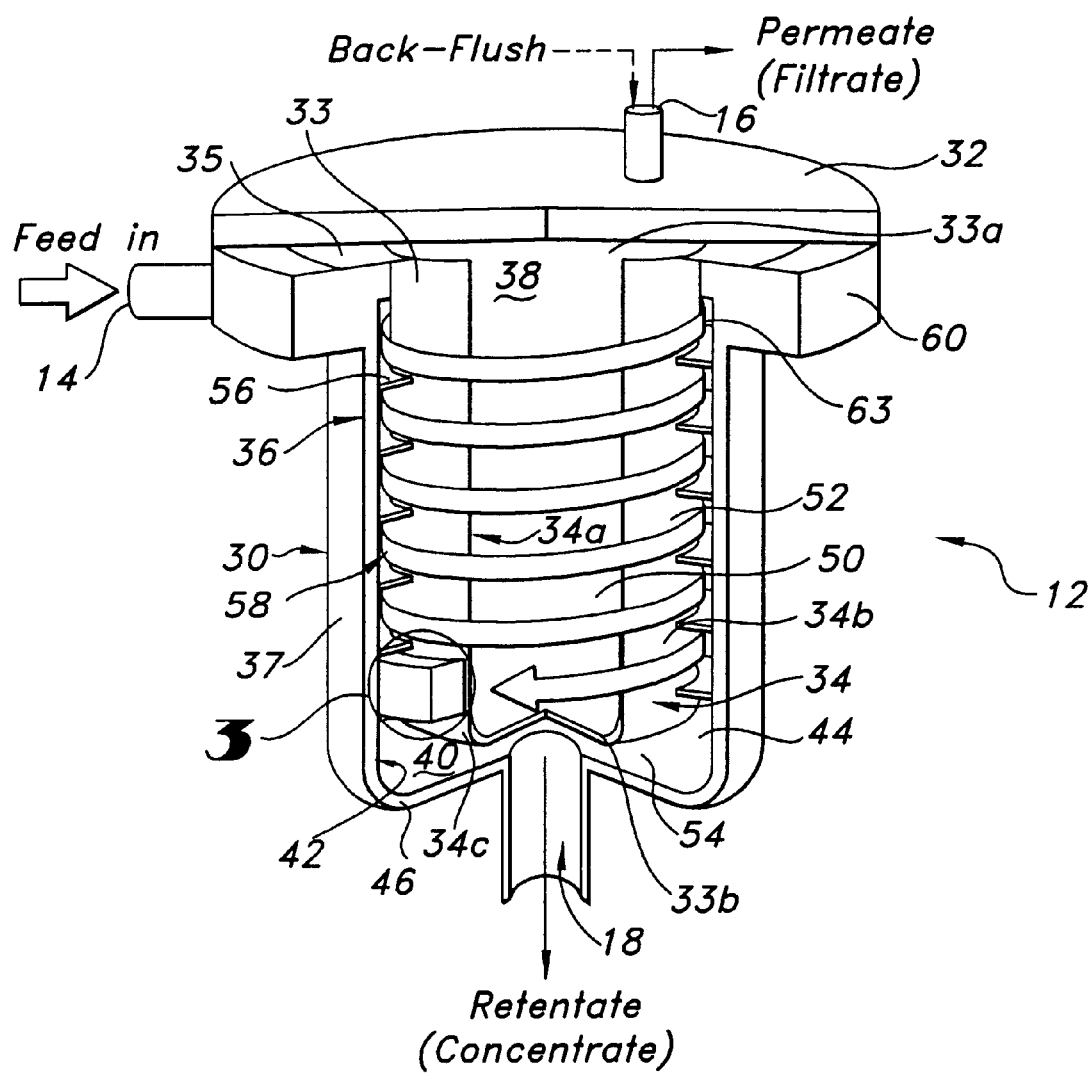
FIG. 2A depicts a filter unit of the present invention.

FIG. 2A depicts a cut-away view of a first embodiment of a filter unit 12 of the present invention. Filter unit 12 includes a filter housing 30, a housing cap wall 32, and an elongate cylindrical porous filter cartridge 33 supported therein. Filter cartridge 33 includes an elongate cylindrical filter media 34 having an inner cylindrical surface 34a, an outer cylindrical surface 34b, and a number of filtration pores 34c (shown in FIGS. 4A and 4B) extending therebetween. Filter media 34 may be formed from known metal, ceramic, or polymeric filters of the prior art and the size of the filtration pores 34c may be selected so as to provide filtration for contaminants or colloidal particles of a known size. The size of the pores 34c may be selected to provide for microfiltration, nanofiltration, ultrafiltration, or particle filtration of a feed fluid. Most particulate or solids will be entrapped along the outer surface 34a of filter media 34.

Filter housing 30 includes a filter housing wall 36 having opposed first and second open ends 38, 40 for conducting filtrate fluid and retentate fluid from housing 30. Filter housing wall 36 includes an elongate cylindrical interior surface 42 defining a housing cavity 44 in which filter 34 is supported. Housing cap wall 32 extends across first open end 38 of housing wall 36 while housing 36 includes a housing base wall 46 extending across second open end 40 thereof Filter housing wall 30 defines input feed port 14, housing cap wall 32 defines filtrate discharge port 16 and housing base wall 46 defines concentrate discharge port 18, each in fluid communication with housing cavity 44.

Filter cartridge 33 further includes a first open end 33a, an opposed second closed end 33b, and defines an elongate filtrate-conducting passageway 50 extending therebetween. First open end 33a of filter cartridge 33 is positioned in abutting fluid-tight engagement against housing cap wall 32. Filtrate-conducting passageway 50 is positioned in unobstructed fluid communication with filtrate discharge port 16 for conducting filtrate fluid from filter unit 12. Filter cartridge 33 also includes an annular flange 35 from which filter media 34 depends.

Outer filter surface 34b and interior surface 42 of filter housing wall 36 define an annular gap 52 therebetween for conducting input feed fluid between input feed port 14 and concentrate discharge port 18. Additionally, closed end 33b of filter cartridge 33 is supported in spaced registry with concentrate discharge port 18 so as to define a concentrate reservoir 54 portion of housing cavity 44 therebetween. A spiral guide 56 extends through gap 52 between filter media 34 and filter housing wall 36 so as to define a spiraling fluid passageway 58 along outer filter surface 34b. Spiraling fluid passageway 58 terminates at a location adjacent closed end 33b of filter cartridge 33 and is in fluid communication with concentrate reservoir 54.

Filter housing 30 includes an annular flange 60 supported in coplanar alignment with annular flange 35 of filter cartridge 33. Filter housing 36 and filter cartridge end 33a define an annular fluid entryway 63 therebetween. Fluid entryway 63 is in fluid communication with Feed input port 14 and spiral fluid passageway 58. Feed input port 14 is desirably configured to orient fluid flow into fluid entryway 63 in a direction substantially tangential to the outer surface 34b of filter media 34.

Figure 2B:
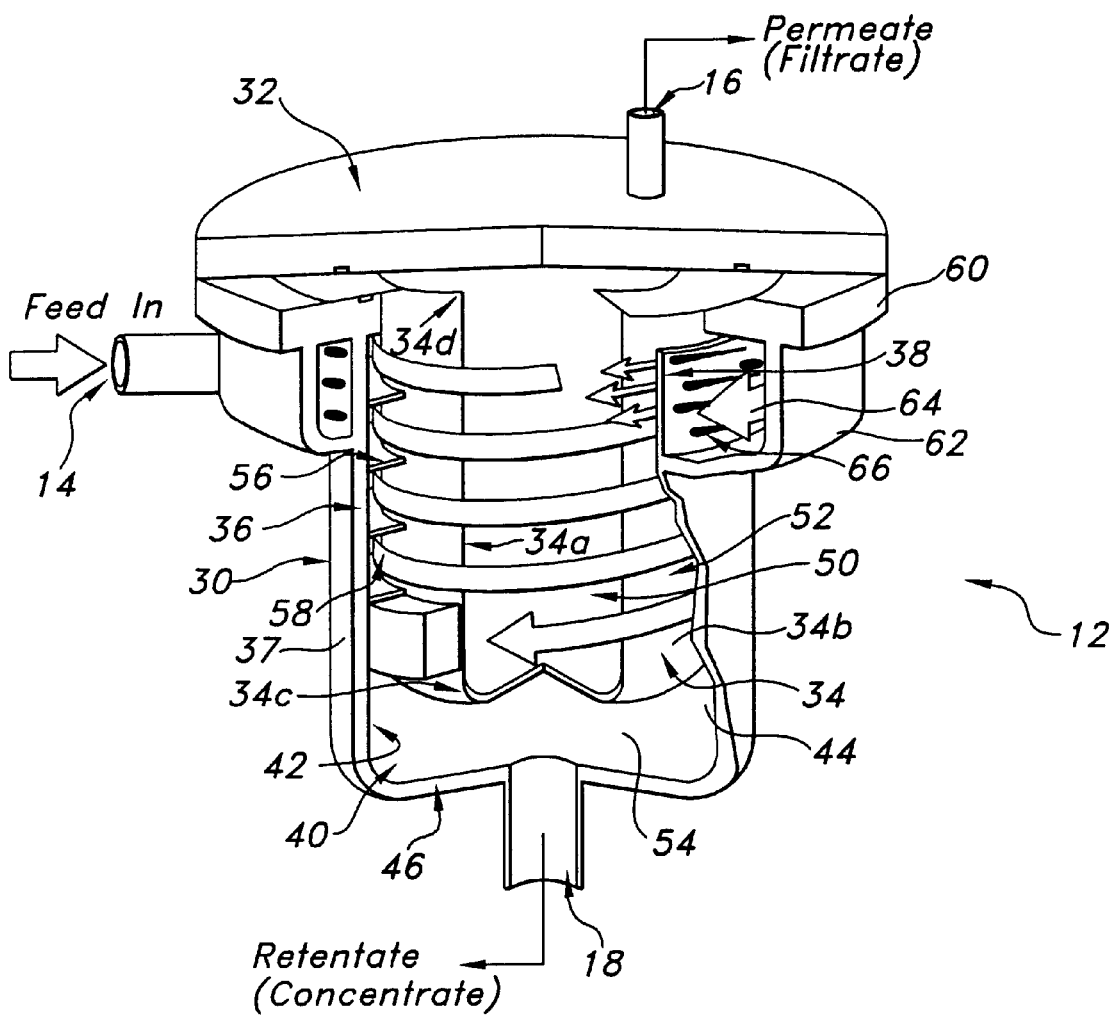
FIG. 2B depicts a filter unit of the present invention employing an annular channel and flow nozzles for directing feed fluid into the spiral fluid passageway.

FIG. 2B depicts an alternate embodiment of filter unit 12 in which annular flange 60 of filter housing 30 further includes depending annular collar 62 concentrically mounted to housing 30 and defining a fluid entry channel 64 therebetween. Filter housing wall 36 defines a plurality of flow nozzles 66 rendering entry channel 64 in fluid communication between with housing cavity 44. Flow nozzles 66 are desirably configured to orient fluid flow into spiraling fluid passageway 58 in a direction substantially tangential to outer surface 34b of filter media 34. Feed input port 14 similarly is desirably configured to orient fluid flow into entry channel 64 in a direction substantially tangential to the outer surface 34a of filter media 34.

Figure 3:
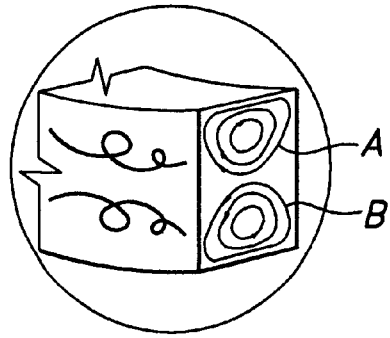
FIG. 3 depicts a sectional view of fluid passing the filter unit of FIG. 2.

The present invention controls fluid flow through spiraling passageway 58 so as to induce a secondary current along filter media 34 in the shape of a toroidal corkscrew. This secondary current provides a shear flow across outer filter surface 34b that carries away particulate entrained by filter media 34. This shear flow provides the present invention with a surface cleaning feature that prolongs the operational capacity of filter media 34. Desirably, fluid flows through spiraling passageway 58 at a flowrate sufficient to induce Dean-Flow vortices. FIG. 3 depicts a cross-sectional view of fluid flowing through spiraling passageway 58 and having counter-rotating Dean-Flow currents depicted by arrows A and B. The toroidal corkscrew currents provide cross-flow filtration across outer filter surface 34b. That is, while fluid is flowing through spiraling passageway 58 and particulate is entrapped by filter 34, the rotational flow of the current through passageway 58 tends to wash the particulate away from filter 34. Dean-Flow currents A and B, further still, have been found to maximize the surface cleaning capability of filter unit 12. As less particulate is collected by filter 34 over a period of time, the mean time between required cleanings or replacement of filter 34 may be significantly increased.

Figure 4A:
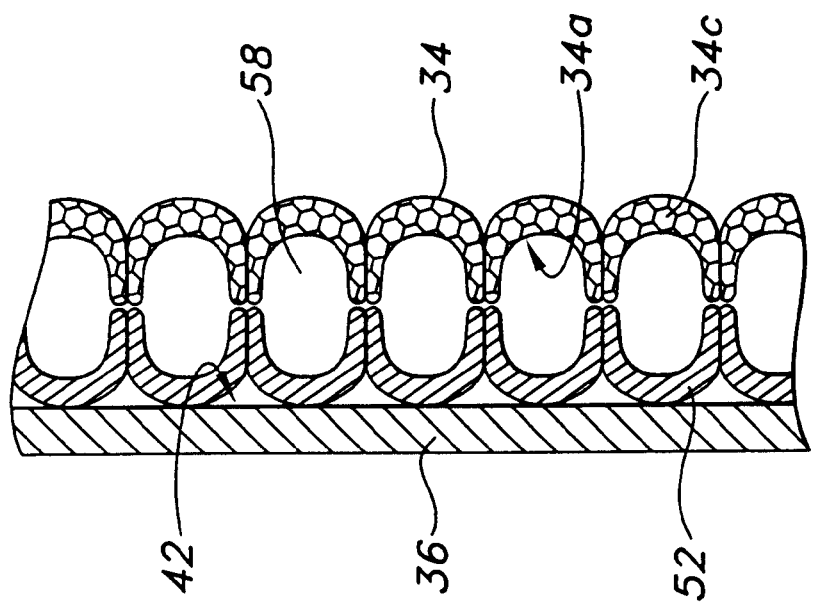
FIGS. 4A and 4B depict alternate cross-sectional shapes for the spiral passageway.
Figure 4B:
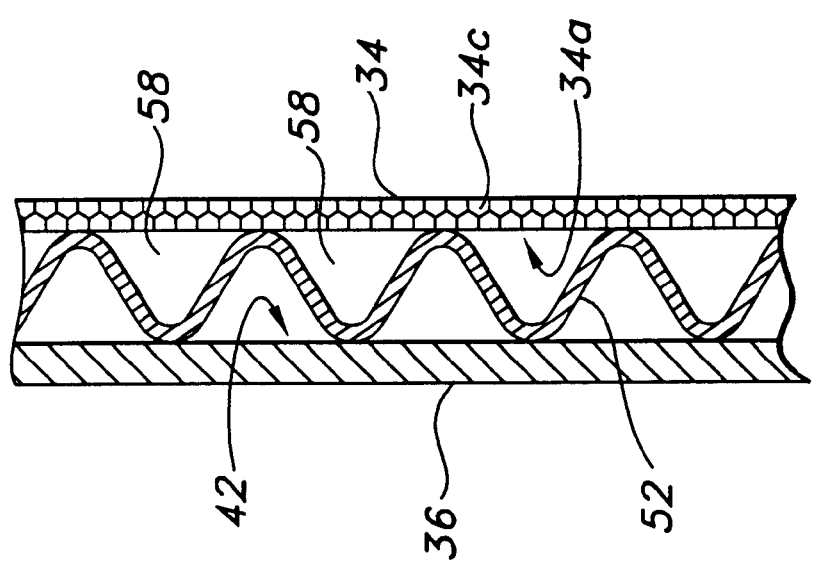

Spiral flow-paths of various cross-sectional geometries are known to induce Dean-Flow currents. Fluid passageway 58 is shown in FIG. 2 as having a generally rectangular cross-sectional area. The present invention also contemplates shaping fluid passageway 58 to have other cross-sectional shapes. For example, FIGS. 4A shows that spiral guide 52 may take the form of a coiled V-shaped channel to provide a triangular surface opposite fluid passageway 52 from exterior surface 34a of filter media 34 to approximate a triangular cross-section. Alternatively, as shown in FIG. 4B, spiral guide 52 may take the form of a U-shaped channel to provide a semi-circular surface opposite exterior surface 34a of filter media 34. Additionally, FIG. 4B depicts that the present invention contemplates also shaping exterior surface 34a of filter media 34 so as to still further shape the cross-section of fluid passageway 58, such as by forming a concave spiral groove to track alongside fluid passageway 58. The shape of the impression may mirror that provided across fluid passageway 58 by spiral guide 52 and interior surface 42 of housing 36. Further still, interior surface 42 of housing 36 may be formed having a shaped spiral groove extending in adjacent registry to fluid passageway 58. It is further contemplated by the present invention that fluid passageway 58 may be formed having a cross-sectional area that decreases along its length so as to further resist the pressure drop which occurs between the input and output ends of the passageway.

Figure 5:
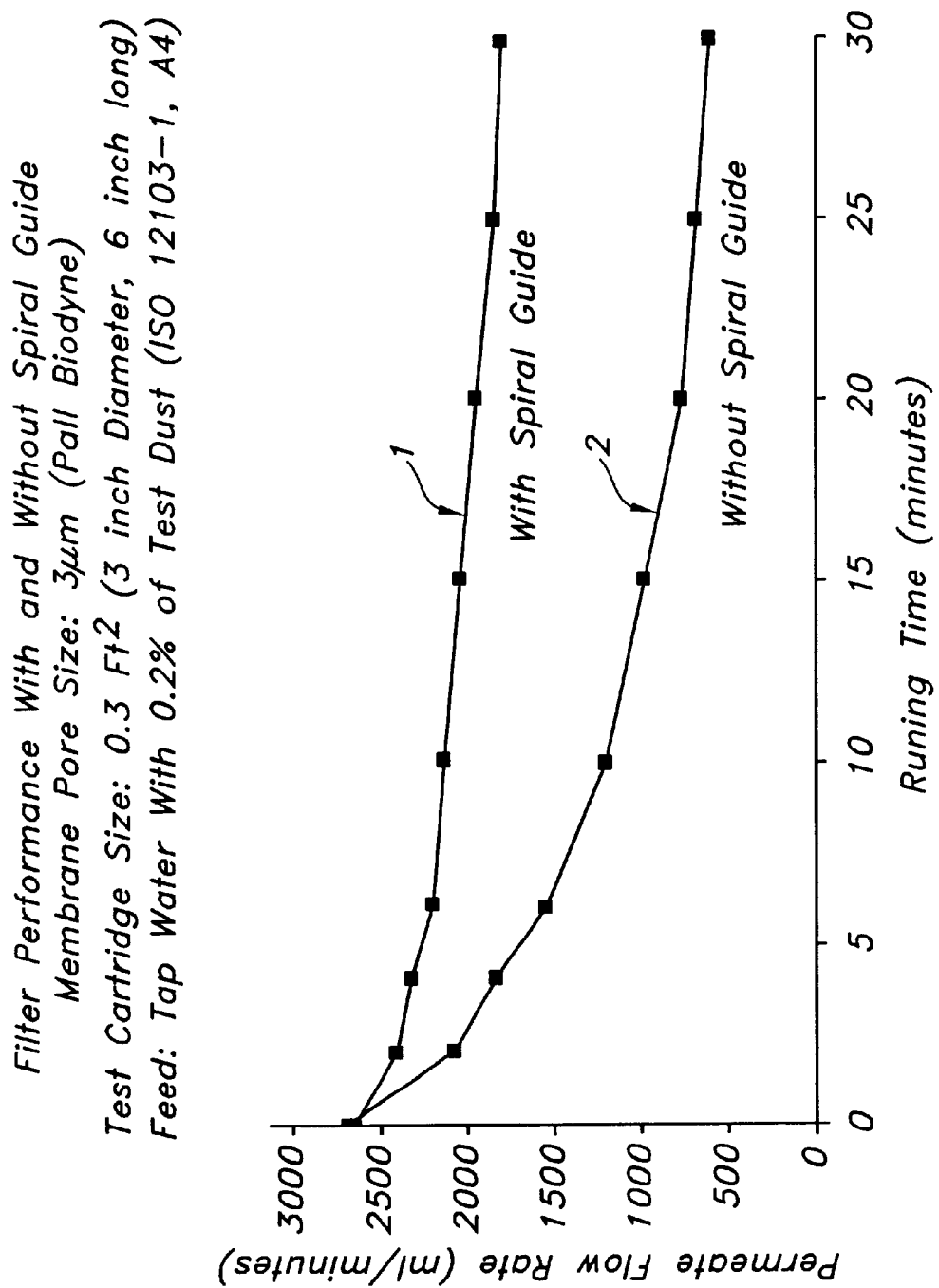
FIG. 5 is a graph depicting the permeate flow rate for a filter unit of the present invention as compared with a filter unit of the prior art.

Tests have been conducted comparing cross-flow filter unit 12 with and without a spiral guide spanning between a substantially cylindrical filter media and the inner wall of the filter housing. FIG. 5 depicts the permeate flow rate from the filter unit as a function of time. A filter cartridge manufactured by Pall Biodyne having a membrane pore size of 3 microns and a cylindrical surface are of 0.3 square feet was employed in a cylindrical housing. The cartridge had an outer diameter of 3 inches and a length of six inches. The spiral guide spanning between the filter unit and the housing wall provided a spiral passageway 9 millimeters wide and a pitch, or height, of 16 millimeters. Tap water having 0.2% of ISO 12103-1, A4 test dust was circulated through filter unit 12 at approximately 8 meters per second for trials lasting approximately 30 minutes. As seen in FIG. 5, a test run 1 employing a spiral guide maintained a superior permeate flow rate throughout the trials as compared to a test run 2 where no spiral guide was present. The permeate flow rate is seen to degrade less for test run 1. FIG. 4 indicates the effectiveness of secondary flow currents, particularly Dean-Flow currents, in clearing filter media 34 when a spiral guide is employed spanning between the exterior surface 34a of filter media 34 and interior surface 42 of housing 36. Filter unit 12 thus exhibits superior flux-rate across filter media 34 for a longer period of time when Dean-Flow currents are induced in passageway 58. Dean-Flow filtration thus provides for a longer mean-time between required back-flushing of filter unit 12 and better permeate flow rate through filter unit 12. Previous tests of filter unit 12 without a spiral guide demonstrated a significant build-up of particulate towards the inlet end of the filter media while tests employing the addition of spiral guide 56 and secondary flow generation have demonstrated significant reduction in particulate build-up.

Figure 7:
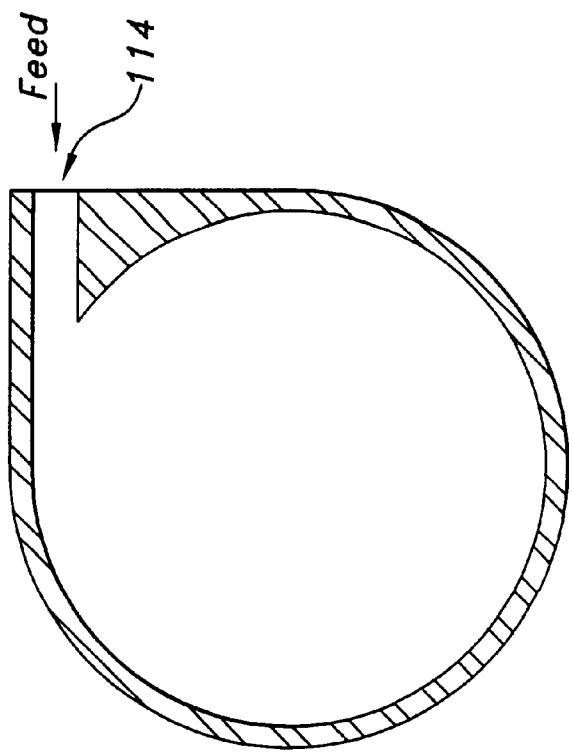
FIG. 7 shows a cross-sectional view of the inlet end of the filter unit of FIG. 6, taken through the line 7—7.
Figure 6:
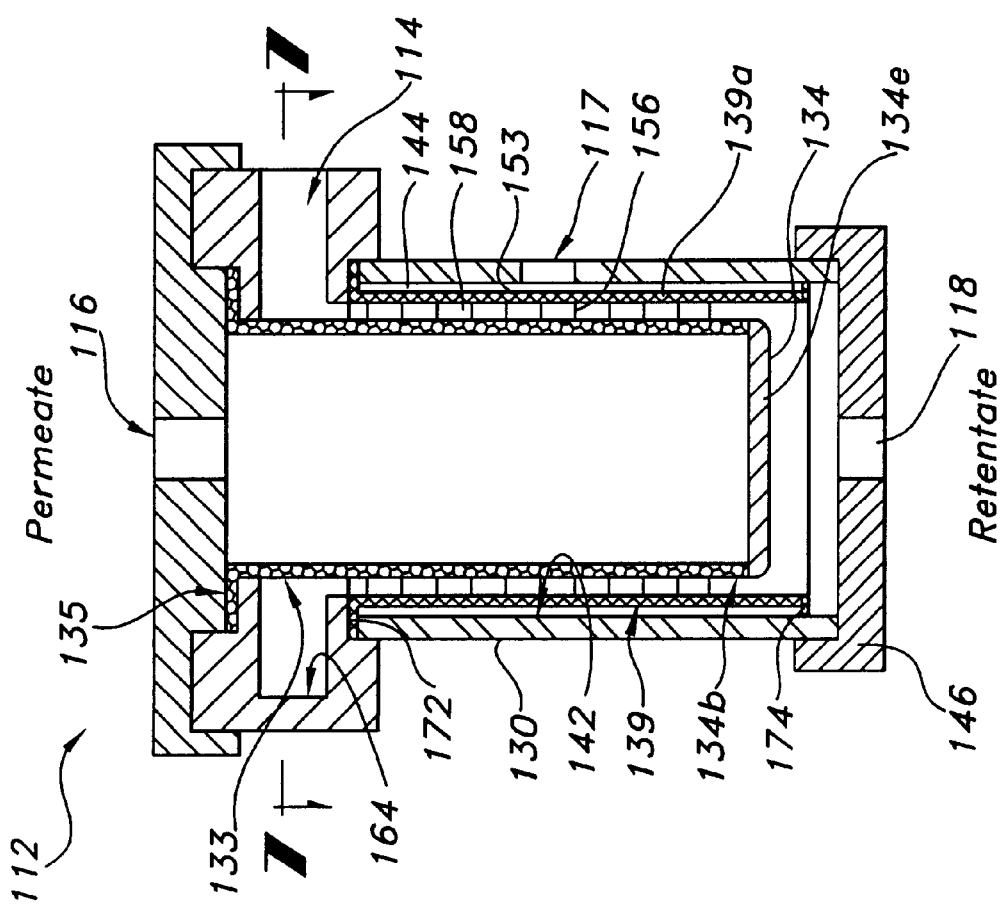
FIG. 6 shows an elevational cross-section of an alternate fluid filter employing a pair of concentrically-mounted filters.

FIGS. 6–7 depict an alternate filter unit 112 of the present invention which mounts a pair of concentrical cylindrical filter cartridges 133 and 139 about a spiral guide 156 spanning therebetween. Outside filter 139 provides additional capability to entrap particulate from the feed fluid flowing through spiral passageway 158. Filter unit 112 is similar in many respects to filter unit 12 and similar numbering denotes similar components. Filter cartridge 133 includes an elongate cylindrical filter media 134 depending from an annular flange 135. Filter media 134 defines an exit aperture in fluid communication with permeate discharge port 116 and opposite to a closed end 134e provided in spaced overlying registry with retentate discharge port 118. Outside filter cartridge 139 includes an elongate cylindrical filter media 139a extending between first and second annular flanges 172 and 174. Flange 174 abuts in fluid-tight engagement against housing base 146. Outside filter cartridge 139 is shown supported within cavity 144 so as to define a secondary gap 153 with interior surface 142 of filter housing 130. Filter housing 130 further defines a secondary permeate discharge port 117 in fluid communication with secondary gap 153 for conducting away the secondary permeate fluid.

FIGS. 8–10 show yet another filter unit 212 of the present invention which supports a plurality of filtration assemblies 215 constructed in accordance with the present invention. Each filtration assembly 215 includes a porous filter cartridge 233 supported within a concentrically-mounted filter housing 230. Each filter cartridge 233 includes an elongate cylindrical filter media 234 depending from an annular filter flange 235. Each filter housing 230 includes an annular housing flange 270. Filter flange 235 is positioned in fluid tight abutment upon housing flange 270. A spiral guide 256 spans an annular gap 252 formed between the outer filter surface 234b and the interior housing wall surface 236 so as to form a spiraling fluid passageway 258 extending between a input feed port 214 and concentrate discharge port 218 defined by filter housing 230.

Each input feed port 214 desirably orients feed fluid flow in a substantially tangential direction to the outer surface 234b of filter media 234. Each filtration assembly 215 is supported within a filter unit housing 290. Filter unit housing 290 provides a feed fluid throughport 272 in fluid communication with the input feed port 214 and a retentate discharge port 274 in fluid communication with each concentrate discharge port 218. A filter housing cap wall 232 is positioned in sealing registry over filter unit housing 290 and each supported filtration assembly 215. Cap wall 232 defines a permeate discharge port 216 in overlying registry with the associated permeate fluid passageway 250 for each supported filtration assembly 215. Cap wall 232 also defines a fluid discharge port 275 in fluid communication with each permeate discharge port 216.

A baffle plate 276, defining a filter aperture 278 for supporting each filtration assembly 215 therein, is supported by filter unit housing 290. Flanges 235 and 270 of each filtration assembly 215 are supported in fluid tight engagement baffle plate 276 and cap wall 232. Baffle plate 276 is shaped such that cap wall 232 and baffle plate 276 define an annular feed fluid channel 286 therebetween. Baffle plate 276 and cap wall 232 also define individual tangential feed fluid conduits 288 communicating between annular feed fluid channel 286 and each feed input port 214 of each filtration assembly 215. Both feed fluid channel 286 and tangential feed fluid conduits 288 are desirably formed as open grooves in baffle plate 276.

As each filtration assembly 215 employs a filter media 234 having a relatively small outside diameter, the diameter of each spiral flowpath 258 is minimized. For purposes of illustration and not of limitation, the diameter of filtration assembly 215 is desirably in the range of about one to six inches, although the present invention may be employed in still larger or smaller applications. As is known for inducing Dean-Flow currents, a smaller radius of curvature for a pipe requires a lower tangential velocity for Dean-Flow formation. Filter unit 212 provides a larger effective filter surface area than was provided, for example, by filter unit 12. Moreover, as the fluid pressure gradient may vary along feed fluid channel 286, the present invention contemplates that each filtration assembly 215 may be provided with unique component dimensions so as to optimize the formation of secondary flow currents, particularly Dean-Flow currents, therethrough.

FIGS. 11–13 show still yet another filter unit 312 of the present invention which supports sixteen filtration assemblies 315 of the present invention in a 4×4 matrix. Each filtration assembly 315 is similar to filtration assembly 215 and includes concentric filter housing 330 and filter cartridge 333. Filter housing 330 abuts filter cartridge 333 in fluid tight engagement at respective flanges 370 and 335. Each filtration assembly 315 further includes a linear tangential feed fluid conduit 388 in fluid communication with a feed fluid input port 314 defined by filter housing 330. Feed fluid conduit 388 desirably extends substantially tangentially to outer surface 334b of filter media 334.

Filter unit 312 includes first and second support baffles 376 and 380 defining a feed fluid cavity 386 therebetween. A third porous baffle 381 is located towards the opposite end of the filtration assemblies 315 to provide additional support and to allow concentrate fluid to flow from the concentrate discharge port 318 of each filtration assembly 315 to a retentate discharge port 374 of filter unit 312. Feed fluid throughport 372 is in fluid communication with the input feed port 314 of each filtration assembly 315 through feed fluid cavity 386. Although feed fluid throughport 372 is shown opening through one planar wall of filter housing 330, the present invention contemplates that additional fluid throughports may be provided so as to better maintain a uniform fluid pressure gradient at each input feed port 314 supported across feed fluid cavity 386.

Each filtration assembly 315 includes a spiral guide 356 (shown in phantom lines) extending between concentrically-supported outer filter housing 330 and an inner porous filter media 334 so as to define a spiraling fluid passageway 358. Open end 333a of filter cartridge 333 defines a filtrate discharge port 316. Filter media 334 defines an elongate filtrate-conducting passageway 350 extending between opposed closed end 333b and open end 333a of filter cartridge 333. Filtrate-conducting passageway 350 is in fluid communication with permeate discharge port 316. Each permeate discharge port 316 is in fluid communication with a filtrate discharge port 375 defined by housing 330. Each filtration assembly 315 further defines a concentrate discharge port 318 in fluid communication with fluid passageway 358 and a retentate discharge port 374 defined by filter housing 330. The present invention again contemplates, as the fluid pressure gradient may vary across feed fluid channel 386, that each filtration assembly 315 may be provided with unique component dimensions so as to optimize the formation of secondary flow currents, particularly Dean-Flow currents, therethrough.

Operation of filter unit 312 appears identical to an operator as the other filter units of the present invention. A fluid to be filtered enters through feed fluid throughport 372 and is forced through the spiral fluid passageway 358 of each filtration assembly 315. The fluid is forced through each fluid passageway 358 at a flow rate sufficient to form Dean Flow currents therein so as to provide enhanced secondary-flow cleaning of the filter media 334. Periodically, filter unit 312 will be back-flushed by reversing fluid flow from filtrate discharge port 375, through each permeate discharge port 316, and back through filter media 334 to dislodge any entrapped particulate.

It is also contemplated that other filter units employing the filtration assembly of the present invention are within the scope of the present invention. For, example, while filter unit 312 employed a 4–4 matrix of filtration assemblies 315, filter units are contemplated for arraying the filtration assembly 215. That is, a number of filtration assemblies 315 may be arrayed within a round housing and spaced to fit within. Such arrays are consistent with providing a filter unit which may be scaled and configured to a variety of different workspaces.

It is also contemplated that the filtration assemblies and filter units of the present invention are readily employed in reverse osmosis, nano-filtration, ultra-filtration, micro-filtration, and screen mesh, or particle, filtration applications.

While the particular embodiments of the present invention have been shown and described, it will be obvious to those skilled in the art that changes and modifications may be made without departing from the teachings of the present invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A cross-flow filtration assembly comprising:
   a filter housing including an elongate housing wall having opposed first and second open ends and an elongate cylindrical interior surface defining a housing cavity, a housing cap wall extending across said first open end of said housing wall, and a housing base wall extending across the second open end of said housing wall;
   said filter housing further defining an input feed port, a permeate output port, and a retentate output port in fluid communication with said housing cavity, wherein said input feed port extends substantially tangential to said interior surface of said housing cavity;
   an elongate porous filter mounted within said housing cavity between said input feed port and said permeate output port, said filter defining an open first end an opposed closed second end and an elongate cylindrical permeate passageway extending therebetween, said permeate passageway in fluid communication with said permeate output port through said first open end of said filter, said filter including a substantially cylindrical outer filter surface, wherein said outer filter surface and said interior surface of said housing wall define an elongate annular gap therebetween; and
   a spiral guide extending through said annular gap and spanning between said outer filter surface and said interior surface of said housing wall so as to define a fluid flow passage extending between said input feed port and said retentate output port;
   wherein said spiral guide imparts a secondary flow across said outer filter surface and perpendicular to a fluid flowing through said spiral passageway.

2. The cross-flow filtration assembly of claim 1, wherein said pitch and width of said spiral define a cross-sectional area for said fluid flow passage which, for the velocity of fluid flow therethrough, induces Dean Flow currents in the fluid flowing through said spiral passageway.

3. The cross-flow filtration assembly of claim 2, wherein fluid enters said filter assembly through said input feed port and into said fluid flow passage along a substantially tangential flowpath along said filter.

4. The filtration assembly of claim 1, wherein said fluid passageway is formed to include a substantially rectangular cross-sectional shape.

5. The filtration assembly of claim 1, wherein said fluid passageway is formed to include a substantially circular cross-sectional shape.

6. The filtration assembly of claim 1, wherein said fluid passageway is formed to include a substantially triangular cross-sectional shape.

7. A filter unit comprising:
   a cross-flow filtration assembly including:
   an elongate cylindrical filter housing having an interior cylindrical wall defining an elongate filter cavity, a tangential feed inlet port in fluid communication with said filter cavity extending substantially tangential to said interior cylindrical wall, and a retentate outlet port in fluid communication with said filter cavity;
   an elongate cylindrical filter cartridge having an elongate porous cylindrical filter wall having an elongate cylindrical outer filter surface, an elongate inner filter surface defining a permeate passageway, wherein one end of said cartridge defines a permeate outlet port in fluid communication with said permeate passageway and the opposite end of said cartridge is closed by a non-porous filter cap, wherein said porous cylindrical filter wall extends between said feed inlet and said permeate outlet port; and
   a spiral fluid guide spanning between said interior cylindrical wall of said filter housing and said outer filter surface, said spiral guide defining a spiral fluid passageway extending between said feed inlet port and said retentate outlet port.

8. The filter unit of claim 7, wherein said spiral fluid passageway is of dimension so as to impart Dean-Flow currents to fluid flowing therethrough, the Dean-Flow currents providing a secondary flow across said outer filter surface.

9. The filter unit of claim 8, further comprising:
a filter unit housing defining a filter unit housing cavity and a fluid feed port, a concentrate outlet port, and a filtrate outlet port in fluid communication with said filter unit housing cavity; and
a plurality of said cross-flow filtration assemblies mounted within said housing cavity whereby for each of said plurality of cross-flow filtration assemblies said tangential feed inlet is in fluid communication with said fluid feed port of said filter housing, said retentate outlet port is in fluid communication with said concentrate outlet port of said filter housing, and said permeate passageway is in fluid communication with said filtrate outlet port of said filter housing.

10. The filter unit of claim 9, wherein the spacing between said outer filter surface and said interior filter housing surface, and the pitch of said spiral fluid guide is optimized for each of said plurality of cross-flow filtration assemblies so as to induce Dean Flow currents in fluid passing therethrough.

11. The filter unit of claim 10, wherein said filter unit housing further includes an elongate generally cylindrical filter housing having opposed open and closed ends defining a central housing cavity for supporting said plurality of filtration assemblies, said filter unit further comprising a housing cap supported in fluid tight overlying registry with said open end of said filter housing.

12. The filter unit of claim 11, wherein said housing cap defines said filtrate outlet port.

13. The filter unit of claim 11, further comprising a baffle plate mounted with said filter unit housing cavity, said baffle plate defining a plurality of filtration assembly apertures, each said filtration assembly aperture for accommodating one of said plurality of cross-flow filtration assemblies, said baffle plate further provided to guide fluid between said fluid feed port of said filter housing and each said tangential feed inlet of each of said plurality of cross-flow filtration assemblies.

14. The filter unit of claim 9, wherein said filter housing of said cylindrical filter wall further comprises an elongate cylindrical porous outer filter having opposed interior and exterior cylindrical surfaces, said exterior cylindrical surface of said filter housing and said interior filter housing wall defining a secondary permeate passageway for conducting permeate fluid from said filter unit.

15. The filter unit of claim 9, wherein said filter housing extends concentrically about the entire length of said filter.

16. The filter unit of claim 9, wherein said closed end of said filter extends in spaced registry above said retentate output port of said filter housing.

17. A method of filtering colloidal particles from a fluid, said method comprising the steps of:
providing a filtration assembly comprising an interior cylindrical filter, an outer cylindrical filter housing concentrically supported about said interior cylindrical filter so as to define an annular fluid cavity therebetween, a spiral guide spanning between said filter and said housing so as to define a spiral fluid passageway from one end of said filter to the opposed end of said filter;
providing a feed fluid having colloidal matter suspended therein into said assembly substantially tangential to an interior surface of said filter housing; and
forcing said feed fluid having colloidal matter suspended therein through said fluid passageway at a velocity sufficient to induce Dean Flow currents in the fluid so as to provide a shear cleansing current across said filter.

* * * * *